United States Patent
Iwao (10) Patent No.: US 9,212,709 B2
(45) Date of Patent: Dec. 15, 2015

(54) HALF-ENGAGE CLUTCH POINT LEARNING DEVICE FOR WET MULTIPLE DISK CLUTCH

(75) Inventor: Nobuyuki Iwao, Kanagawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 1079 days.

(21) Appl. No.: 12/312,302

(22) PCT Filed: Nov. 19, 2007

(86) PCT No.: PCT/JP2007/072373
§ 371 (c)(1),
(2), (4) Date: May 5, 2009

(87) PCT Pub. No.: WO2008/062750
PCT Pub. Date: May 29, 2008

(65) Prior Publication Data
US 2010/0057317 A1    Mar. 4, 2010

(30) Foreign Application Priority Data

Nov. 22, 2006  (JP) ................................. 2006-315900

(51) Int. Cl.
*G06F 7/00* (2006.01)
*G06F 17/00* (2006.01)
(Continued)

(52) U.S. Cl.
CPC .............. *F16D 48/066* (2013.01); *F16D 48/02* (2013.01); *F16D 2500/3024* (2013.01);
(Continued)

(58) Field of Classification Search
CPC ..... F16D 48/06; F16D 48/062; F16D 48/064; F16D 48/066; F16D 48/068; F16H 61/43; F16H 2061/145; F16H 2061/062; F16H 2061/064; F16H 2061/283; F16H 2342/00; F16H 2342/02; F16H 2342/04; F16H 2342/042; F16H 2342/044; F16H 2342/06; B60W 2050/0063; B60W 2050/0075; B60W 2050/0083; B60W 2050/0086; B60W 2050/0088; B60W 2510/02; B60W 2510/0208; B60W 2510/0216; B60W 2510/0255; B60W 2510/0233; B60W 2510/0241; B60W 2510/025; B60W 2710/02; B60W 2710/021; B60W 2710/022; B60W 2710/023; B60W 2710/024; B60W 2710/025; B60W 2710/026
USPC .......... 192/3.29, 3.33; 701/51, 55, 56, 58, 67, 701/68
See application file for complete search history.

(56) References Cited

U.S. PATENT DOCUMENTS 6,658,341 B2   12/2003  Inoue et al.
6,733,299 B2    5/2004  Eguchi et al.
(Continued)

FOREIGN PATENT DOCUMENTS

JP        62-178448      8/1987
JP        63-19426       1/1988
(Continued)

*Primary Examiner* — Jeffrey Shapiro
(74) *Attorney, Agent, or Firm* — McGinn IP Law Group, PLLC.

(57) ABSTRACT

A power transmission device for a vehicle equipped with a wet multiple disk clutch for disconnecting the power at the time of gearshift by using a clutch controller, wherein the amount of engagement where the clutch is half-engaged is learned maintaining precision. In the present invention, the clutch controller of the wet multiple disk clutch moves a clutch piston over the whole stroke thereof by using the working fluid for varying the amount of engagement at the start of learning the amount of engagement at a point where the clutch starts half-engaging and, immediately thereafter, the amount the clutch is half-engaged is detected. Upon moving the clutch piston, the working fluid present among the friction disks of the wet multiple disk clutch is drained and is replaced by the new working fluid avoiding detection error caused by the fluctuation in the temperature of the working fluid and eliminating unstable operation of the clutch piston caused by static friction of a large resistance. The amount of engagement at the point where the clutch starts half-engaging is determined by gradually increasing the amount of engagement after the clutch is disengaged and detecting a change in the rotational speed of the clutch input shaft.

11 Claims, 8 Drawing Sheets

(51) Int. Cl.
*G06F 19/00* (2011.01)
*F16D 48/06* (2006.01)
*F16D 48/02* (2006.01)

(52) U.S. Cl.
CPC ............... *F16D 2500/30406* (2013.01); *F16D 2500/31466* (2013.01); *F16D 2500/50251* (2013.01); *F16D 2500/70488* (2013.01); *F16D 2500/7109* (2013.01)

(56) References Cited

U.S. PATENT DOCUMENTS

| | | | |
|---|---|---|---|
| 6,755,766 B2* | 6/2004 | Inoue et al. | 477/71 |
| 2002/0183912 A1* | 12/2002 | Inoue et al. | 701/67 |
| 2003/0073535 A1 | 4/2003 | Eguchi et al. | |
| 2003/0114271 A1* | 6/2003 | Inoue et al. | 477/117 |
| 2005/0032606 A1* | 2/2005 | Takagi | 477/156 |
| 2005/0204737 A1* | 9/2005 | Yoshida | 60/487 |
| 2005/0222735 A1* | 10/2005 | Usuki et al. | 701/51 |
| 2005/0222738 A1* | 10/2005 | Imamura et al. | 701/67 |
| 2006/0272919 A1* | 12/2006 | Kawamoto et al. | 192/88 R |
| 2007/0112502 A1* | 5/2007 | Asano et al. | 701/111 |
| 2008/0125284 A1* | 5/2008 | Tanaka et al. | 477/39 |
| 2008/0236155 A1* | 10/2008 | Nakano et al. | 60/437 |

FOREIGN PATENT DOCUMENTS

| | | |
|---|---|---|
| JP | 63-72923 | 4/1988 |
| JP | 2002-295529 | 10/2002 |
| JP | 2003-120721 | 4/2003 |
| JP | 2005-220937 | 8/2005 |
| JP | 2005-226762 | 8/2005 |
| WO | WO 2008/062750 A1 | 5/2008 |

* cited by examiner

HALF-ENGAGE CLUTCH POINT LEARNING DEVICE FOR WET MULTIPLE DISK CLUTCH

TECHNICAL FIELD TO WHICH THE INVENTION BELONGS

This invention relates to a clutch control device for a power transmission device for a vehicle which has a wet multiple disk clutch between an engine and a transmission, and is so constituted as to automatically disengage the wet multiple disk clutch at the time of gearshift for shifting the gear of the transmission.

BACKGROUND ART

It is a modern trend of the vehicles to employ a power transmission device for vehicles which automatically executes the shifting operation or the clutch operation for easy driving. One of such power transmission devices for vehicles is a power transmission device used for diesel engine-mounted vehicles, employing a transmission of the type of parallel shaft gear mechanism operated by an actuator, arranging an automatic clutch, and interposing a fluid coupling between the engine and the automatic clutch. Upon interposing the fluid coupling for a diesel engine which produces a large torque in a region of small engine rotational speeds, in particular, it is made possible to start the vehicle by utilizing the slipping between the pump and the turbine in the fluid coupling. Namely, no delicate clutch operation is necessary that is required by the manual shift vehicles at the time of start, yet smooth start is easily accomplished absorbing fluctuation in the engine torque during idling and reducing vibration and noise.

The power transmission device interposing the fluid coupling will now be described with reference to a schematic diagram of FIG. 1. A fluid coupling 2 is joined to the rear of a diesel engine 1, and a transmission 4 having a parallel shaft gear mechanism is coupled thereto via a clutch 3. An output shaft of the transmission 4 is coupled to a propeller shaft that drives the wheels of a vehicle and is coupled to the wheels via a final reduction gear.

In the fluid coupling 2, there arranged a pump 21 integral with the output shaft of the diesel engine 1 and a turbine 22 integral with an input shaft 32 of the clutch 3. The two are basically coupled together by a lockup clutch 23 except at the start of the vehicle and, therefore, the output shaft of the diesel engine 1 is directly coupled to the input shaft 32 of the clutch 3. Further, the transmission 4 is a transmission of the type of ordinary parallel shaft gear in which a gear spline formed integrally with a gear is brought into mesh with a shift sleeve, and is equipped with a known synchronizing mechanism comprising a synchronizer ring or the like. The transmission 4 effects the gearshift by using a shift actuator 61 responsive to a shift instruction from an electronic control device. A vehicle which is not equipped with the electronic control device effects the gearshift by using a shift lever operated by a driver.

Figure 1:
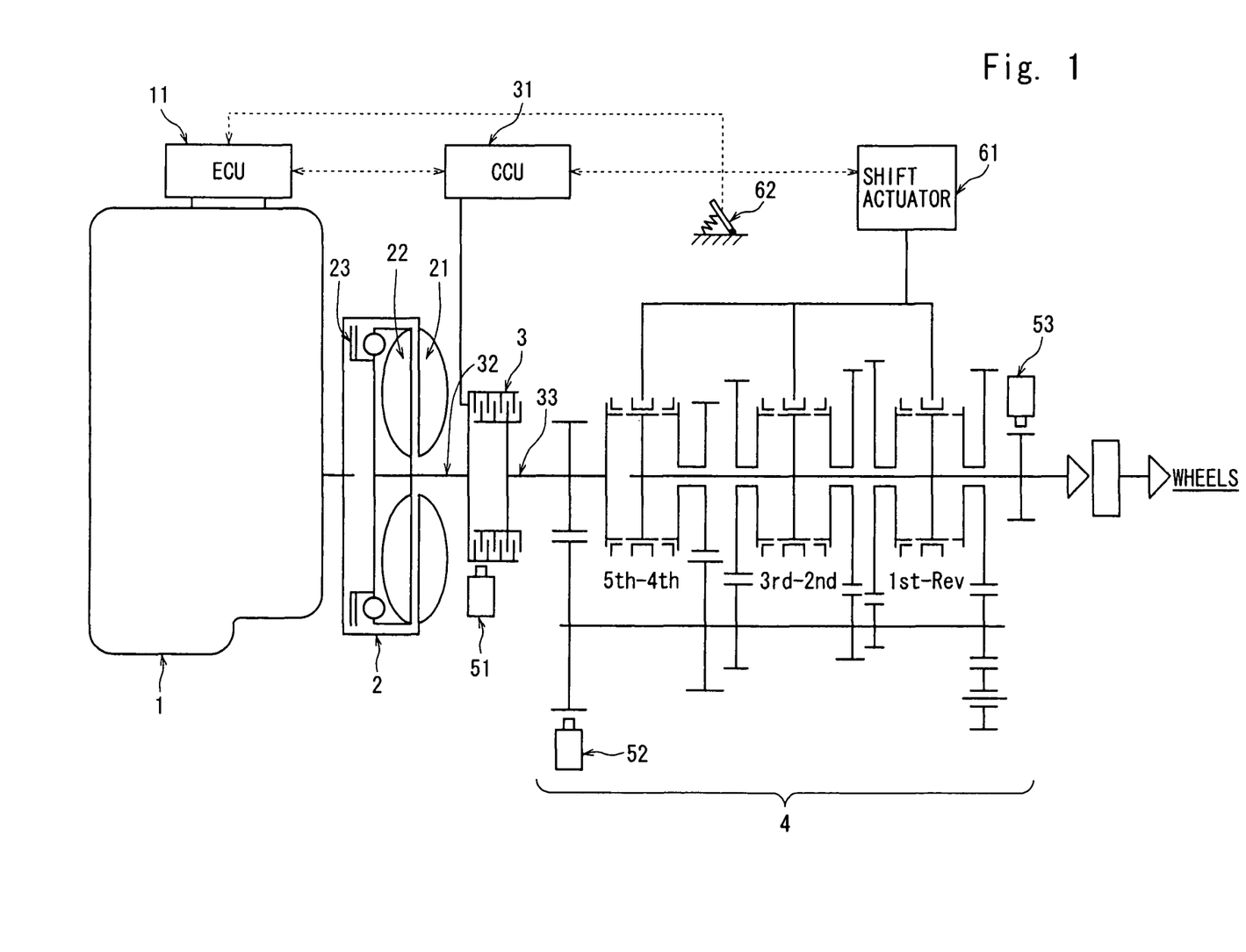
[FIG. 1] is a schematic view of a power transmission device for a vehicle to which a control unit of the present invention is applied.
Figure 2:
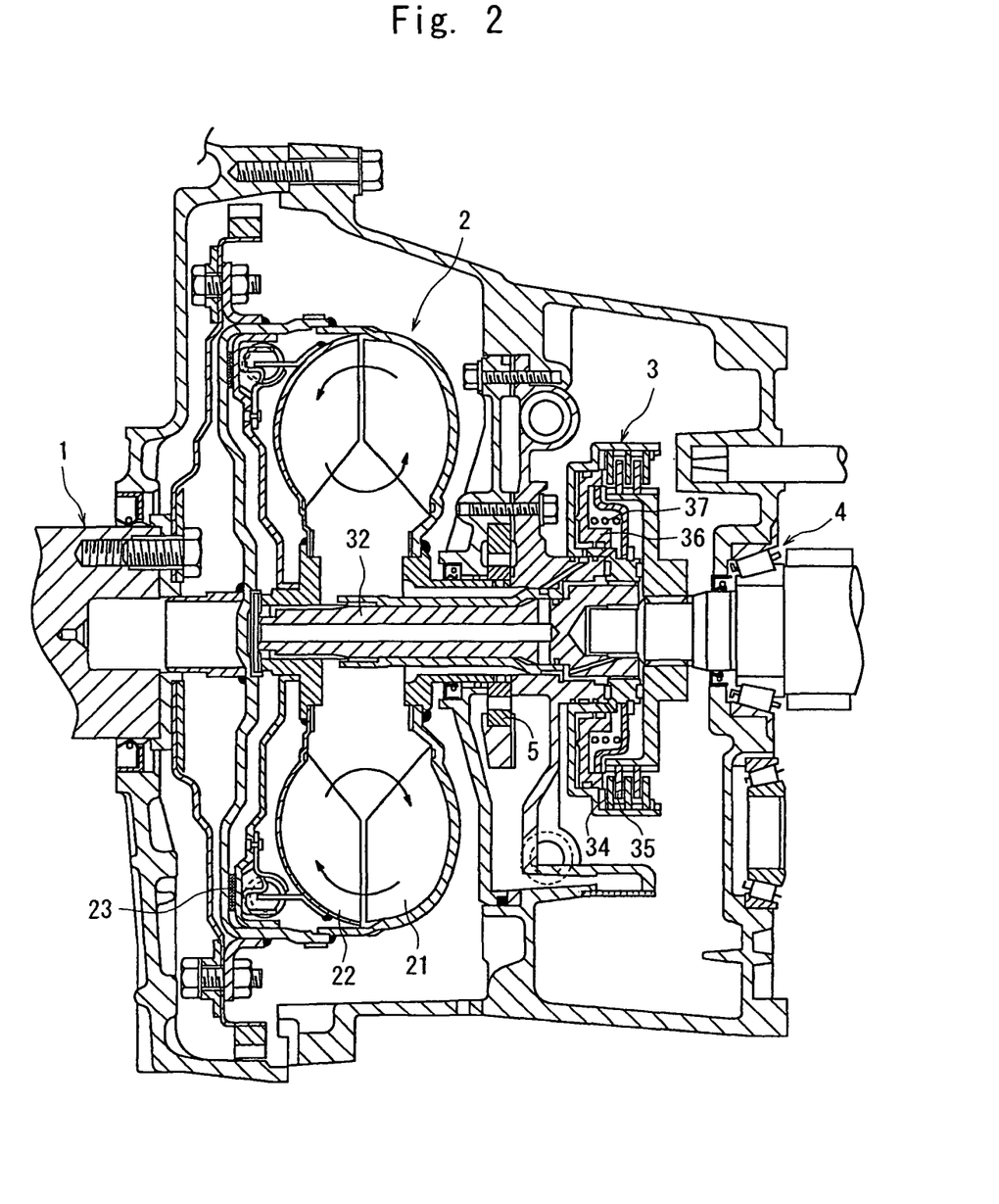
[FIG. 2] is a detailed view of the periphery of a fluid coupling and a wet multiple disk clutch.

Referring to FIG. 2, the power transmission device of FIG. 1 employs a wet multiple disk clutch 3 as an automatic clutch. In the wet multiple disk clutch 3, there are alternately arranged a plurality of friction disks 34 attached to a member that is fitted by spline to the clutch input shaft 32 and a plurality of friction disks 35 attached to a member that is fitted by spline to the clutch output shaft 33. There is, further, arranged a clutch piston 36 for pushing them. If a working fluid is fed into a hydraulic chamber at the back of the clutch piston 36, the friction disks are pressure-contacted and the clutch engages. If the working fluid is drained, the clutch piston 36 is pushed by a spring 37 whereby the friction disks separate and the clutch is disengaged. A trochoidal oil pump 5 is provided between the fluid coupling 2 and the wet multiple disk clutch 3, and the working fluid is pressure-fed from the oil pump 5 into the interior of the wet multiple disk clutch 3 via passages formed in the circumference of the shaft of the turbine 22, and to the back of the clutch piston 36, too, through a control valve. The working fluid is pressure-fed from the oil pump 5 into the interior of the fluid coupling 2, too, via a fluid passage formed in the input shaft of the clutch.

Figure 3:
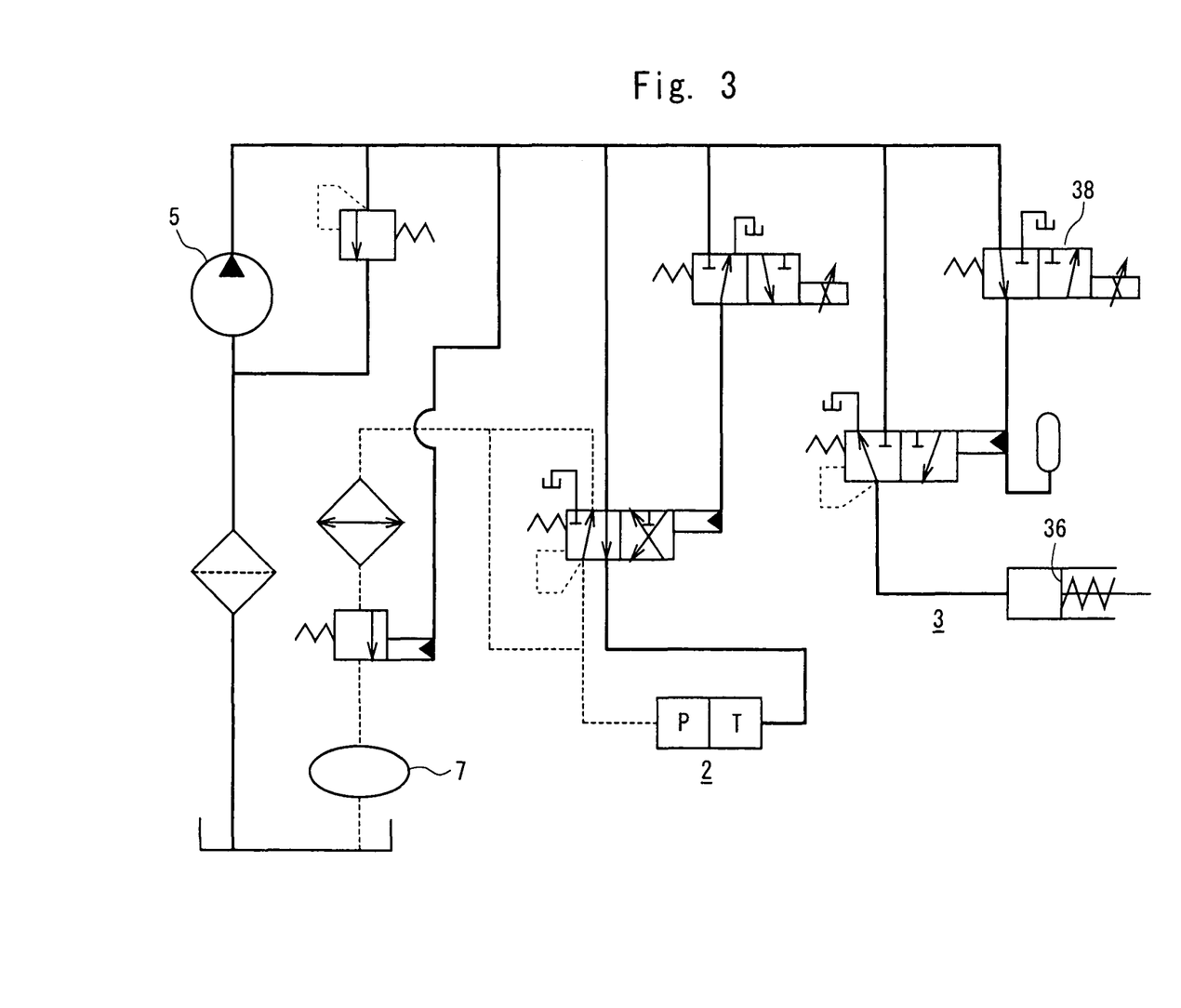
[FIG. 3] is a schematic view of a circuit for feeding a working fluid.

FIG. 3 illustrates a circuit for feeding the working fluid. The working fluid is pressure-fed from the oil pump 5 to the fluid coupling 2 as well as to the wet multiple disk clutch 3. The pressure-fed working fluid is introduced into the interiors of the fluid coupling 2 and the wet multiple disk clutch 3 and is, further, used for controlling the lockup clutch 23 and the clutch piston 36. The fluid returning from these devices is cooled through an oil cooler 7 provided integrally with the radiator of the engine, and is refluxed into an oil tank.

The wet multiple disk clutch 3 is provided with a clutch control unit 31 (FIG. 1) which controls the amount of engaging the clutch in cooperation with an engine control unit 11 at the time of shifting the gear of the transmission 4. Here, at the time of shifting, the engine control unit 11 executes a control independently of the amount the accelerator pedal 62 is depressed.

The amount the clutch 3 is engaged is controlled by adjusting an electromagnetic valve 38 (FIG. 3) depending upon a duty ratio D of a pulse output by the clutch control unit 31 to thereby control the hydraulic pressure acting on the clutch piston 36 that pushes the friction disks. The clutch has been so set as to be engaged with a duty ratio D of 0% and disengaged with D of 100% in a steady state.

The clutch control unit 31 receives rotational speed signals transmitted from a rotational speed sensor 51 that detects the rotational speed of the input shaft 32 of the clutch 3 (rotational speed of the turbine 22 in the fluid coupling 2), rotational speed signals transmitted from a rotational speed sensor 52 that detects the rotational speed of the output shaft 33 of the clutch 3 (rotational speed of the input shaft of the transmission 4) and rotational speed signals transmitted from a rotational speed sensor 53 that detects the rotational speed of the output shaft of the transmission 4. The rotational speed signals are used for controlling the amount of engagement.

At the time of gearshift, the clutch control unit 31 gradually varies the amount of engaging the clutch 3 to avoid shift shock or engine stall caused by a sudden transmission of torque. For example, to engage the clutch 3 after the gears have been engaged, the clutch control unit 31 so controls the duty ratio as to gradually increase the amount of engaging the clutch 3. The clutch 3 undergoes the slipping in a state of a so-called half-engage clutch so that the engine rotational speed and the input shaft rotational speed of the transmission 4 are gradually brought into agreement with each other. When the clutch is completely engaged (D=0%), the slipping amount becomes zero, and the diesel engine 1 is placed in a state where it is directly coupled to the input shaft of the transmission 4.

Here, in a region where the amount the clutch 3 is engaged is not still reaching the half-engaged state of the clutch, the torque is not almost transmitted even if the hydraulic pressure is elevated from the state of being disengaged. To quickly accomplish the disengagement, therefore, the above region must be passed over within a short period of time. Further, the wet multiple disk clutches 3 really mounted on the individual vehicles have their own differences. Besides, even the same clutch undergoes a change due to aging. Therefore, the amount of engagement where the clutch starts half-engaging varies depending upon each clutch. Accordingly, a hydraulic pressure value at a point where the clutch starts half-engaging must be learned at regular intervals or, in other words, a duty ratio that serves as the amount of engagement which starts substantially transmitting the torque must be learned at regular intervals for each of the individual vehicles. By using a half-engage clutch learned value that is successively updated, the clutch control unit 31 makes it possible to execute the clutch control correctly and quickly.

The state where the clutch is half-engaged has generally been learned in the vehicles equipped with an automatic clutch. For example, there has been known a method of learning the amount of engagement with which the transmission input shaft starts rotating while gradually increasing the amount of engaging the clutch. Further, a method of learning the amount of engagement in a state where the clutch 3 is half-engaged in a power transmission device equipped with a fluid coupling has been disclosed, for example, in JP-A-2002-295529. According to this publication, the state where the clutch is half-engaged is learned when the vehicle is at a halt with the gears of the transmission 4 being engaged and the diesel engine 1 rotating. The wet multiple disk clutch 3 is disengaged, and the lockup clutch 23 of the fluid coupling 2 is disengaged, too.

Figure 7:
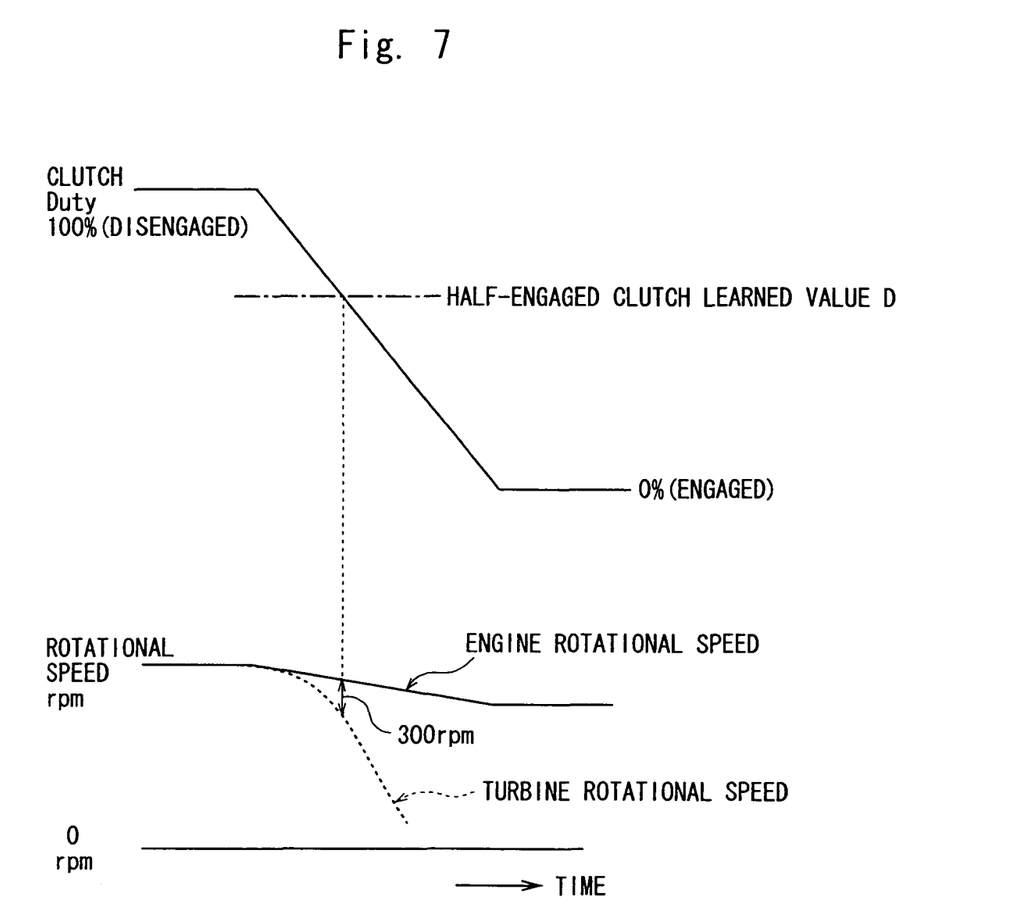
[FIG. 7] is a diagram illustrating a procedure of operation of a conventional half-engage clutch learning device.

Since the wet multiple disk clutch 3 has been disengaged, the turbine 22 of the fluid coupling 2 is rotating nearly at the same rotational speed as the diesel engine 1 being dragged by the pump 21 despite the vehicle is at a halt and the output shaft 33 of the wet multiple disk clutch 3 remains stationary. Referring to FIG. 7, the output duty ratio D of the clutch control unit 31 is decreased from this state and the amount of engaging the wet multiple disk clutch 3 is increased. Since the output shaft 33 of the wet multiple disk clutch 3 remains stationary, the rotational speed of the turbine 22 integral with the input shaft 32 of the wet multiple disk clutch 3 decreases with an increase in the amount of engagement, i.e., with an increase in the amount of transmitting the torque. A duty ratio of when the amount of decrease in the rotational speed of the turbine 22 has reached a predetermined value with respect to the rotational speed of the diesel engine 1 (rotational speed of the pump 21) is stored in the clutch control unit 31 as a half-engage clutch learned value duty ratio.

DISCLOSURE OF THE INVENTION

Problems that the Invention is to Solve

According to the above method of learning the half-engage clutch, a difference between the engine rotational speed and the turbine rotational speed is detected while increasing the amount of engaging the clutch by gradually decreasing the duty ratio produced by the clutch control unit, i.e., while gradually increasing the retarding torque acting on the turbine, and a duty ratio of when the difference has reached a predetermined value is learned as a point where the clutch starts half-engaging. At this moment, the amount the clutch has engaged is determined by the frictional engaging force of the clutch friction disks. When the clutch is the wet multiple disk clutch, therefore, the amount of engagement is affected by the viscosity of the working fluid that is fed into the interior thereof, and the viscosity of the working fluid varies depending upon the temperature. Therefore, the half-engage clutch learned value varies depending upon the temperature of the working fluid. Because of this reason, the clutch control unit controls the amount of engagement by correcting the half-engage clutch learned value depending on the fluid temperature, and finds a duty ratio at a point where the clutch starts half-engaging that corresponds to the fluid temperature in learning the half-engage clutch.

However, the temperature of the working fluid fed into the wet multiple disk clutch often loses stability depending upon the operating conditions of the vehicle. The half-engage clutch can be learned by bringing the gears of the transmission in its neutral state into engagement while the vehicle is halting. When the vehicle is brought into a halt immediately after the engine is operated carrying a high load, however, the thermostat of the radiator for controlling the cooling water temperature of the engine often does not stably operate causing the water temperature to fluctuate and, therefore, causing the temperature of the working fluid to fluctuate. In this case, the temperatures of the oil pump and the wet multiple disk clutch decrease quickly and, therefore, the temperature of the working fluid therein, further, loses stability resulting in a decrease in the precision for detecting the amount of engagement at a point where the clutch starts half-engaging.

Figure 8:
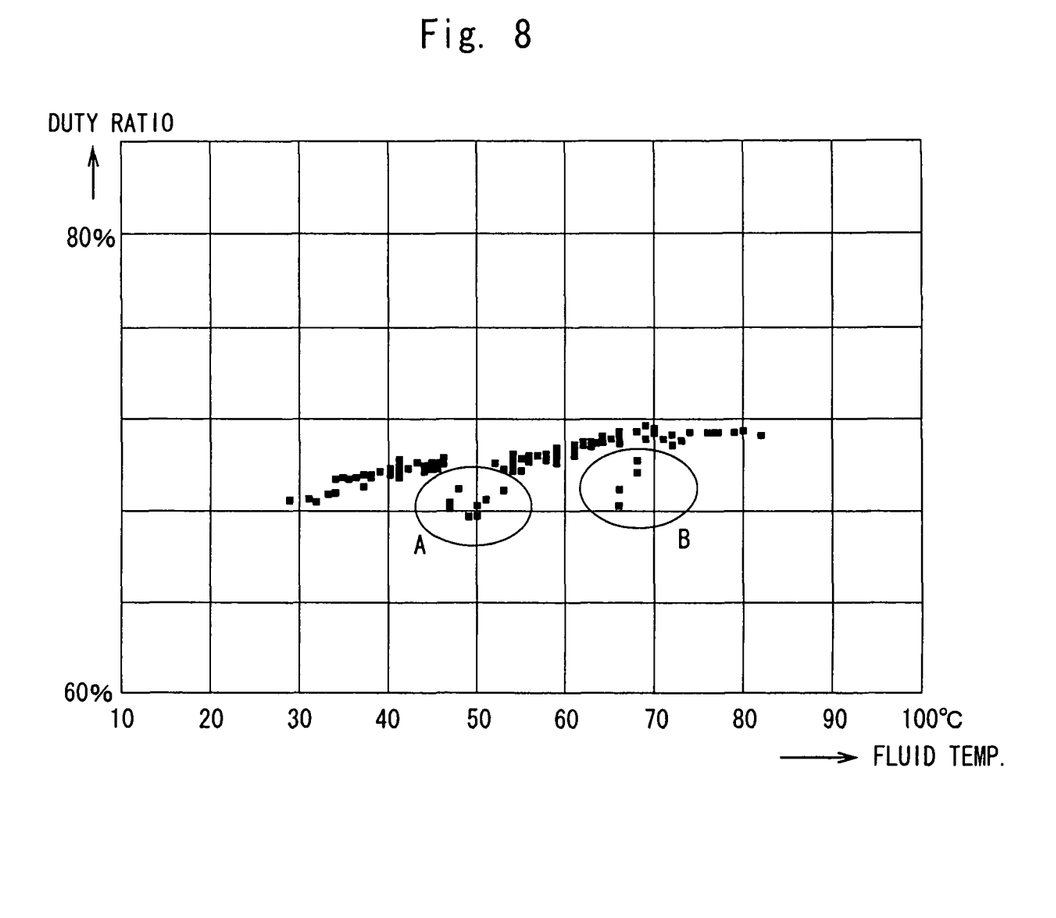
[FIG. 8] is a diagram showing learned values obtained by using the conventional half-engage clutch learning device.

To learn the half-engage clutch, the duty ratio is so decreased that the amount of engagement gradually increases from a state where the wet multiple disk clutch is disengaged, whereby the clutch piston that pushes the friction disks moves in a direction in which the friction disks are joined to each other while compressing the spring. At this moment, the clutch piston at the initial position is at rest and, therefore, the so-called static friction works on the clutch piston, and for that reason, the clutch piston does not often start quickly moving in response to a decrease in the duty ratio. Therefore, a loss of stability in the operation stemming therefrom becomes a factor that lowers the precision for detecting the amount of engagement where the clutch is half-engaged. FIG. 8 illustrates a distribution of temperatures of the half-engage clutch learned values obtained in the conventional half-engage clutch learning, from which it will be understood that the learned values are fluctuating at a portion A and a portion B being affected by unstable temperature of the working fluid and by the static friction.

The present invention is to solve the above problem at the time of learning the amount of half-engaging the clutch in a power transmission device equipped with a wet multiple disk clutch which disconnects the power using a clutch control unit at the time of gearshift. It can be said that the above problem generally prevails when it is attempted to learn the amount the clutch is half-engaged in the power transmission device equipped with the wet multiple disk clutch without being limited to the power transmission device in which a fluid coupling is interposed.

Means for Solving the Problems

In view of the above problem, the present invention deals with a power transmission device for a vehicle equipped with a wet multiple disk clutch and a clutch control unit for controlling the amount of engagement thereof, wherein at the time of learning a state where the clutch is half-engaged, a clutch piston for varying the amount of engagement is moved over the whole stroke thereof and, thereafter, the amount of engagement at a point where the clutch starts half-engaging is learned in order to avoid detection error caused by fluctuation in the temperature and the like. That is, the present invention is concerned with "a clutch control unit" provided for a power transmission device for a vehicle having a wet multiple disk clutch arranged between an engine and a transmission to control the amount of engaging the wet multiple disk clutch at the time of gearshift, wherein:

the wet multiple disk clutch is provided with a clutch piston for varying the amount of engagement, and a working fluid is fed from an oil pump into the interior of the wet multiple disk clutch and into the clutch piston; and the clutch control unit is equipped with a learning device for learning the amount of engagement in a state where the clutch is half-engaged, and controls the amount of engaging the wet multiple disk clutch by using the learned amount of engagement, and the learning device moves the clutch piston over the whole stroke thereof at the start of learning the amount of engagement in the state where the clutch is "half-engaged".

The present invention is suited as a device for learning a state where the clutch is half-engaged in the power transmission device in which the fluid coupling is interposed as shown in FIG. 1. In this case as described in claim 2, the present invention is concerned with "the clutch control unit" as described in claim 1, wherein a fluid coupling is arranged between the engine and the wet multiple disk clutch, and has the interior thereof fed with the working fluid from the oil pump;

the pump of the fluid coupling is coupled to the output shaft of the engine so as to rotate together therewith, the turbine of the fluid coupling is coupled to the input shaft of the wet multiple disk clutch so as to rotate together therewith, and the output shaft of the wet multiple disk clutch is coupled to the input shaft of the transmission; and the learning device includes a detector means for detecting the rotational speed of the turbine of the fluid coupling and the rotational speed of the input shaft of the transmission, shifts the transmission from the neutral state to a state where the gears are engaged at the time of learning the amount of engagement in the state where the clutch is half-engaged, moves the clutch piston over the whole stroke thereof and, thereafter, disengages the wet multiple disk clutch, finds a difference in the rotational speed between the turbine and the input shaft of the transmission by using the detector means while gradually increasing the amount of engagement, and stores the amount of engagement at a moment when the difference in the rotational speed has reached a predetermined value as the amount of engagement in the state where the clutch is half-engaged.

Effects of the Invention

The wet multiple disk clutch used in the power transmission device for a vehicle has its interior fed with the working fluid from the oil pump and, further, drives, by using the working fluid, the clutch piston for varying the amount of engagement. In the present invention, the clutch controller moves the clutch piston over the whole stroke thereof at the start of learning the amount of engagement at a point where the clutch is half-engaged and, thereafter, detects the amount the clutch is half-engaged. Upon moving the clutch piston over the whole stroke thereof, the working fluid present among the friction disks of the wet multiple disk clutch is expelled and drained. When the wet multiple disk clutch is disengaged, therefore, the working fluid is newly fed from the oil pump. The new working fluid is the working fluid that has been cooled through the oil cooler, and it is made possible to avoid detection error in the amount of engagement in the state where the clutch is half-engaged that stems from the fluctuation in the fluid temperature.

Further, if the clutch piston is moved at the start of learning the amount of engagement in a state where the clutch is half-engaged, the amount of half-engaging the clutch is detected starting from the state where the clutch piston is moving. The friction acting on the clutch piston becomes a dynamic friction having a drag smaller than the static friction, and the clutch piston smoothly moves from the start of learning according to an increase in the hydraulic pressure. This prevents the clutch piston from sharply moving, eliminating a decrease in the precision of detecting the amount the clutch is half-engaged that stems from unstable operation caused by static friction and the like. The amount of engagement at a point where the clutch starts half-engaging can be detected by, for example, gradually increasing the amount of engaging the clutch and finding the amount of engagement with which the transmission input shaft starts rotating.

The invention described in claim 2 is concerned with the power transmission device having the fluid coupling interposed between the engine and the wet multiple disk clutch shown in FIG. 1 to which is applied the device for learning the point where the clutch starts half-engaging of the present invention. In this power transmission device, the working fluid is fed into the interior of the fluid coupling, too, by the oil pump that feeds the working fluid to the wet multiple disk clutch, and the working fluid feed circuit is used in common for the two. If the clutch piston of the wet multiple disk clutch is moved over the whole stroke at the time of learning, the clutch is instantaneously engaged. Here, however, since the pump and the turbine have been separated away from each other in the fluid coupling at the time of learning, the engine is not adversely affected even if the clutch is engaged.

In learning the half-engage clutch according to the invention described in claim 2, the transmission is shifted from the neutral state to a state where the gears are engaged, the clutch piston of the wet multiple disk clutch is moved over the whole stroke and, thereafter the wet multiple disk clutch is disengaged, the amount of engagement thereof is gradually increased, and the amount of engagement of when a difference in the rotational speed between the turbine of the fluid coupling and the transmission input shaft has reached a predetermined value is learned as the amount the clutch is half-engaged. According to the device for learning the half-engage clutch disclosed in the above JP-A-2002-295529, when the vehicle is halting, the wet multiple disk clutch is disengaged and, thereafter, the amount of engagement thereof is gradually increased and a duty ratio at a moment when a difference between the engine rotational speed and the turbine rotational speed has reached a predetermined value is used as the half-engage clutch learned value duty ratio. At this moment, however, the engine rotational speed is subject to fluctuate, and the precision of detection may decrease. The learning device of the invention of claim 2, on the other hand, finds a difference in the rotational speed between the turbine and the transmission input shaft. The transmission input shaft is almost free of fluctuation and, therefore, the amount of engagement at the point where the clutch starts half-engaging can be determined maintaining good precision.

BEST MODE FOR CARRYING OUT THE INVENTION

A clutch control unit of a power transmission device for a vehicle to which the invention is applied will now be described with reference to the drawings. Here, however, the devices constituting the power transmission device for a vehicle to which the invention is applied are not particularly different from those of the conventional device shown in FIG. 1. That is, in the power transmission device for a vehicle, a fluid coupling 2 is joined to the rear of a diesel engine 1, and a transmission 4 having a parallel shaft gear mechanism is coupled thereto via a wet multiple disk clutch 3 which is a clutch for automatically disconnecting the power. A pump 21 and a turbine 22 in the fluid coupling 2 are fastened together by a lockup clutch 23 except the start of the vehicle, and the output shaft of the diesel engine 1 is directly coupled to the input shaft of the wet multiple disk clutch 3.

The structure of the wet multiple disk clutch 3 and the circuit for feeding the working fluid are the same as those of a conventional device shown in FIG. 2 and FIG. 3. A working fluid is from an oil pump 5 into the interior of the wet multiple disk clutch 3 and to the back of a clutch piston 36. At the time of gearshift, a clutch control unit 31 outputs a duty ratio D which is a value for instructing the amount of engagement to an electromagnetic valve 38. Responsive thereto, hydraulic pressure acting on the clutch piston 36 that pushes the friction disks of the wet multiple disk clutch 3 varies, and the amount of engaging the wet multiple disk clutch 3 is controlled.

The clutch controller 31 of the present invention is provided with a device for learning the amount of engagement at a point where the clutch starts half-engaging. In conducting the learning according to the present invention, the clutch piston 36 is moved over the whole stroke thereof at a moment of starting the learning, and FIG. 4 illustrates the operation characteristics thereof.

Learning the amount of half-engaging the clutch when a moment for learning is reached is executed when the learning conditions are satisfied, such as the engine is idling, the transmission is in the neutral state, etc. like the learning in a customary manner. At this moment, the lockup clutch 23 of the fluid coupling 2 is disengaged, and the pump 21 and the turbine 22 are disconnected. When the learning conditions hold, the clutch control unit 31 outputs an instruction for starting the learning. Responsive thereto, the transmission which had been in the neutral state is shifted to a start gear of, for example, the first speed or the second speed (see characteristics of the transmission of FIG. 4), and the input shaft of the transmission is directly coupled to the wheels of the vehicle.

Figure 4:
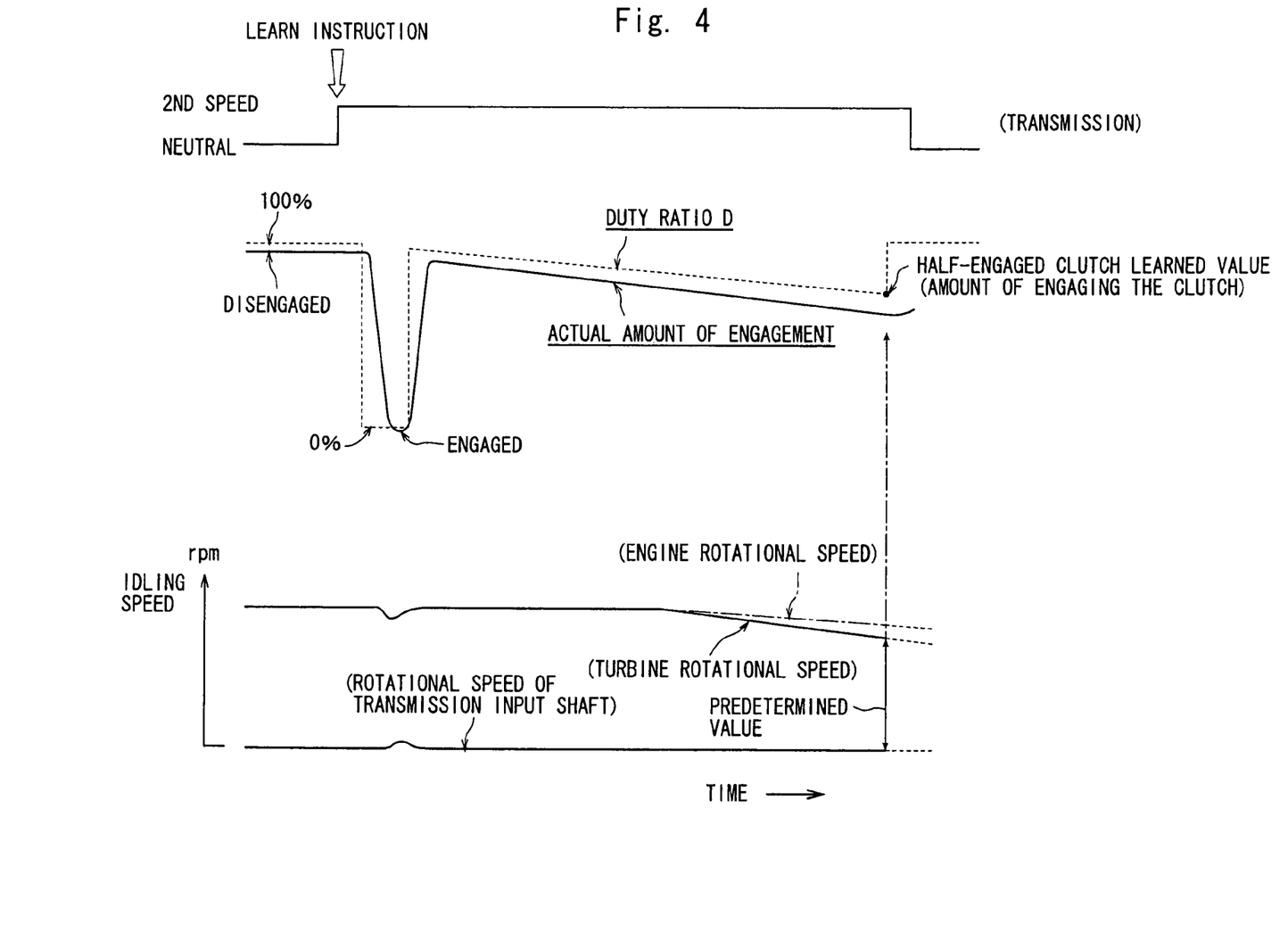
[FIG. 4] is a diagram illustrating working characteristics of a half-engage clutch learning device according to the present invention.

Nearly simultaneously with the engagement of gears of the transmission, the clutch control unit 31 (learning device) produces a duty ratio D of 0% (clutch engagement amount characteristics represented by a broken line in FIG. 4) so that the clutch piston 36 of the wet multiple disk clutch 3 moves over the whole stroke thereof in the direction in which the clutch engages. Therefore, the working fluid rapidly flows into the chamber at the back of the clutch piston 36 while the working fluid is drained from among the friction disks 34, 35. The time in which the duty ratio D is set to be 0% is so short that the clutch is really engaged for only a very short period of time. Besides, since the pump 21 and the turbine 22 in the fluid coupling 2 have been disconnected, the operation does not adversely affect the engine or the power transmission system. Thereafter, the duty ratio D is returned back to 100% to readily start detecting the amount of engagement where the clutch is half-engaged. Here, the duty ratio does not necessarily have to be returned back to 100% but may be returned back to a predetermined duty ratio (a value obtained by adding about 10% to a duty ratio at the start of half-engaging the clutch) with which the clutch is disengaged to shorten the time for detection.

In detecting the amount of engagement at the point where the clutch starts half-engaging immediately after the duty ratio D is returned back to 100% (or to the predetermined duty ratio), the duty ratio D is gradually decreased to gradually increase the amount of engaging the clutch. As the amount of engaging the clutch so increases that the torque is substantially transmitted, resistance acts on the input shaft 32 and the rotational speed of the turbine 22 integral therewith decreases since the output shaft of the wet multiple disk clutch 3 integral with the transmission input shaft 33 remains basically stationary. The learning device (clutch control unit) is provided with detector means 52 and 51 for detecting the rotational speed of the transmission input shaft 33 and the rotational speed of the turbine 22, respectively, detects the duty ratio D of when a difference between the two rotational speeds becomes a predetermined value as a learned value at a point where the clutch starts half-engaging, and stores it. By using the learned value, the clutch control unit 31 corrects and updates the past learned values of the half-engage clutch, and uses them for controlling the amount of engagement at the time of gearshift.

In the learning apparatus of the invention as described above, the clutch piston of the wet multiple disk clutch is moved over the whole stroke thereof at a moment when the learning starts and, immediately thereafter, the amount the clutch is half-engaged is detected. Therefore, the working fluid presenting among the friction disks of the wet multiple disk clutch is expelled, and the new working fluid having a stable temperature replaces for it preventing error in detecting the amount of engagement at a point where the clutch starts half-engaging that stems from the fluctuation in the fluid temperature. Since the amount of engagement where the clutch is half-engaged is detected while continuously moving the clutch piston, it is allowed to prevent a drop in the precision of detection due to unstable operation caused by static friction and the like.

Figure 5:
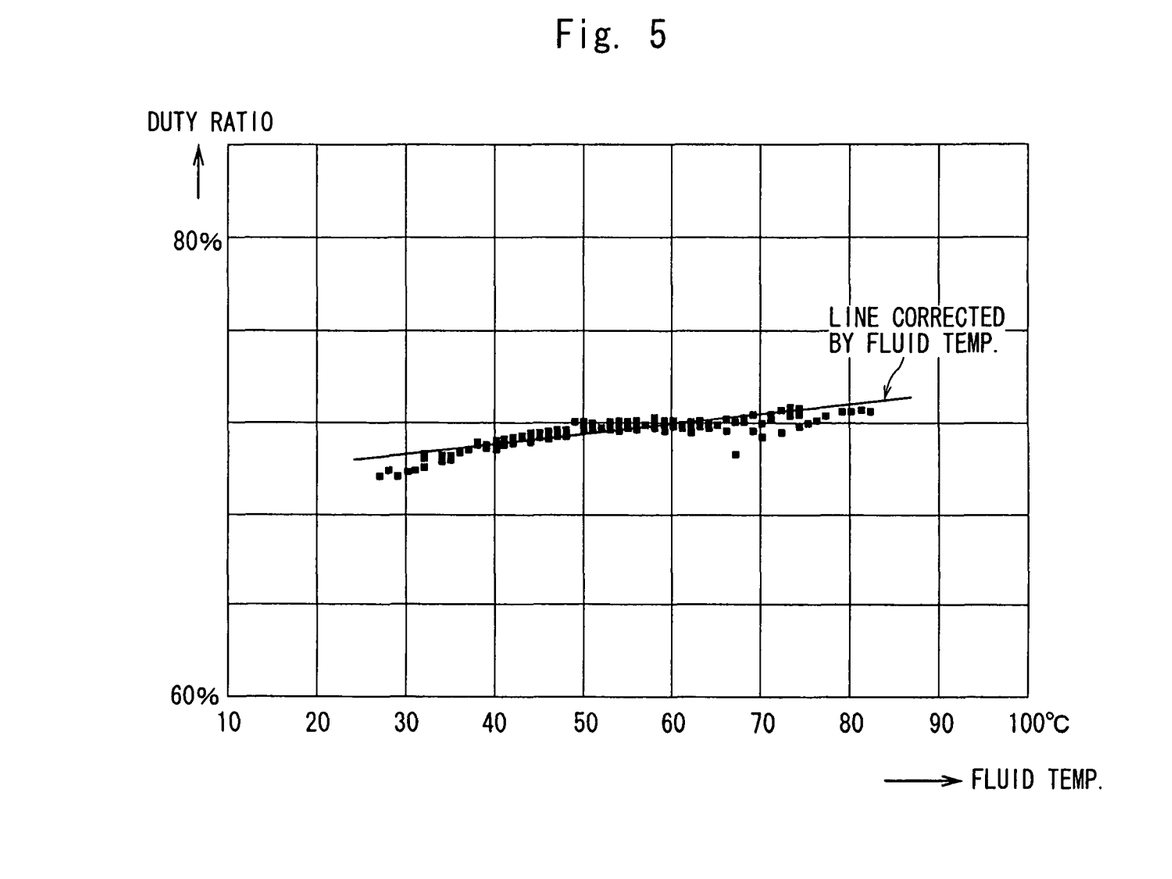
[FIG. 5] is a diagram showing learned values obtained by using the half-engage clutch learning device of the present invention.

FIG. 5 shows the distribution of temperatures for the half-engage clutch learned values obtained by the half-engage clutch learning according to the invention. As will be obvious from the comparison with the similar results by the conventional learning device shown in FIG. 8, there is almost no fluctuation in the learned values, and the precision of detection is greatly improved.

Figure 6:
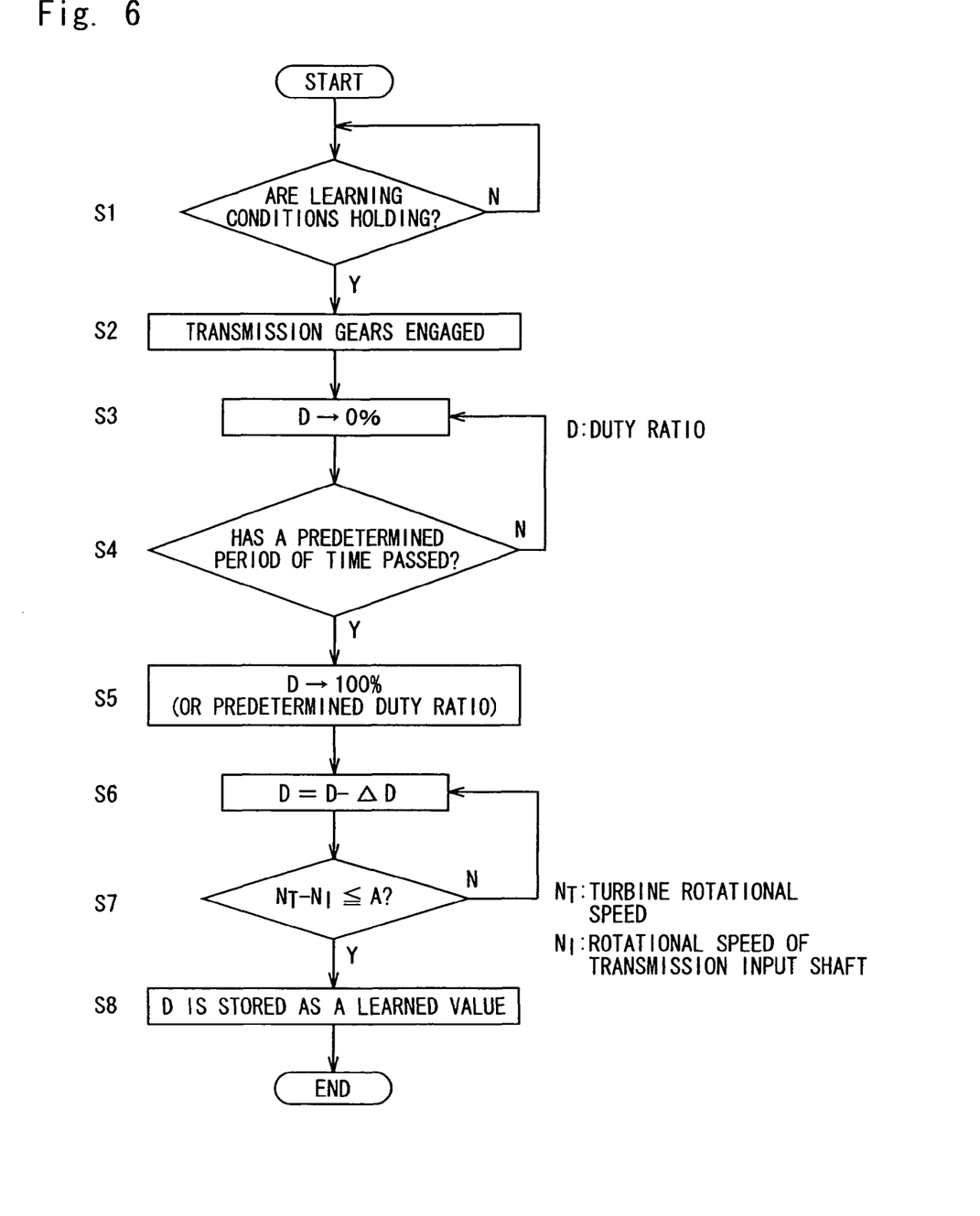
[FIG. 6] is a flowchart illustrating a procedure of operation of the half-engage clutch learning device of the present invention.

FIG. 6 is a flowchart of a procedure of learning a point where the clutch starts half-engaging in the learning device of the present invention. When a moment for learning is reached, it is decided at S1 if the above learning conditions are holding. If the learning conditions are holding, the routine proceeds to S2 where the transmission is shifted from the neutral state to the state where the start gear is engaged.

Next, the routine proceeds to step S3 where the duty ratio D for controlling the amount of engaging the clutch is set to 0%. Therefore, the working fluid is fed to the clutch piston, and the wet multiple disk clutch quickly moves in the direction in which it engages. At S4, it is decided if the time has passed for moving the clutch piston to the engaging position. At a moment the time has passed, the duty ratio D is set to 100% (or to a predetermined duty ratio) and the wet multiple disk clutch is returned back to the disengaged state (S5). Right after the duty ratio D is set to 100%, the duty ratio D starts decreasing by a unit duty ratio which is of a small amount to detect the amount of engagement at a point where the clutch starts half-engaging (S6).

The learning device successively calculates the differences between the turbine rotational speeds and the rotational speeds of the transmission input shaft of when the amount of engagement is gradually increased by decreasing the duty ratio D by the unit duty ratio, and compares the differences with the predetermined value (S7). The torque starts substantially transmitting as the amount of engagement increases by a predetermined amount, and a difference between the two rotational speeds becomes a predetermined value. At step S8, therefore, the duty ratio at that moment is detected as the amount of engagement at the point where the clutch starts half-engaging, and is stored in the learning device. The learned value is the latest value and is used for correcting or updating the past learned value.

Industrial Applicability:

As described above in detail, the present invention is concerned with a power transmission device for a vehicle equipped with an automatically controlled wet multiple disk clutch, wherein at the time of learning the state where the clutch is half-engaged, the clutch piston for varying the amount of engagement is moved over the whole stroke thereof and, thereafter, the point where the clutch starts half-engaging is detected in order to avoid detection error caused by fluctuation in the temperature of the clutch and the like. Though the above embodiment has dealt with the power transmission device having the fluid coupling arranged between the engine and the wet multiple disk clutch, it will be obvious that the learning device of the invention can be applied to the power transmission devices equipped with the wet multiple disk clutch, in general. As for controlling the amount of engaging the clutch, furthermore, it needs not be pointed out that the above embodiment can be variously modified such as employing an analog control system instead of the control system that is based on the duty ratio.

The invention claimed is:

1. A clutch control unit for a power transmission device for a vehicle having a wet multiple disk clutch arranged between an engine and a transmission to control an amount of engagement of said wet multiple disk clutch by varying a duty ratio at a time of gearshift, wherein said wet multiple disk clutch is completely engaged with the duty ratio 0% and disengaged with the duty ratio 100%, wherein said wet multiple disk clutch is provided with a clutch piston for varying the amount of engagement, and a working fluid is fed from an oil pump into an interior of said wet multiple disk clutch, wherein said clutch control unit is equipped with a learning device for learning an amount of engagement of a half-engaged point where said wet multiple disk clutch is half engaged, and controls the amount of engagement of said wet multiple disk clutch at a time of gearshift by using the learned amount of engagement of the half-engaged point, and wherein said learning device moves said clutch piston over a whole stroke thereof by varying the duty ratio from 100% to 0% and returning to a predetermined duty ratio, said predetermined duty ratio being less than 100% and with which said wet multiple clutch is disengaged, said predetermined duty ratio which is about 10% larger than that of the half engaged point, at the start of learning of the half-engaged point, such that the working fluid in said wet multiple disk clutch from the oil pump is replaced by a movement of said clutch piston and thereafter, said learning device gradually decreases the duty ratio to increase an amount of engagement for the learning of the half-engaged point.

2. The clutch control unit according to claim 1, wherein a fluid coupling is arranged between said engine and said wet multiple disk clutch, and the working fluid is fed from said oil pump into an interior of said fluid coupling, wherein a pump of said fluid coupling is coupled to an output shaft of said engine so as to rotate together therewith, a turbine of said fluid being coupled to an input shaft of said wet multiple disk clutch so as to rotate together therewith, wherein said learning device includes a detector for detecting a rotational speed of said turbine of said fluid coupling and a rotational speed of the input shaft of said transmission, and wherein said learning device includes a detector for detecting a rotational speed of said turbine of said fluid coupling and a rotational speed of the input shaft of said transmission, and wherein said learning device shifts said transmission from a neutral state to a state where gears are engaged at a time of the learning of the half-engaged point, and said learning device moves said clutch piston over the whole stroke thereof by varying the duty ratio from 100% to 0% and returning to said predetermined duty ratio which is about 10% larger than that of the half-engaged point at the start of learning of the half-engaged point, such that the working fluid in said wet multiple disk clutch from the oil pump is replaced by the movement of said clutch piston, and thereafter, said learning device gradually decreases the duty ratio to increase the amount of engagement, and, at a moment when a difference in the rotational speed between said turbine and the input shaft of the transmission has reached a predetermined value, said learning device stores the amount of engagement as the half-engaged point.

3. The clutch control unit according to claim 1, wherein said learning device moves said clutch piston reciprocatively over the whole stroke.

4. The clutch control unit according to claim 1, wherein said learning device moves said clutch piston reciprocatively over the whole stroke at the start of learning of the half-engaged point.

5. The clutch control unit according to claim 1, wherein an output shaft of said wet multiple disk clutch is coupled to an input shaft fo said transmission.

6. The clutch control unit according to claim 5, wherein said learning device includes a detector for detecting a rotational speed of a turbine of a fluid coupling arranged between said engine and said wet multiple disk clutch, and a rotational speed of the input shaft of said transmission.

7. The clutch control unit according to claim 6, wherein said learning device shifts said transmission from a neutral state to a state where gears are engaged at a time of the learning of the half-engaged point.

8. The clutch control unit according to claim 7, wherein, when a difference in the rotational speed between said turbine and the input shaft of the transmission reaches a predetermined value, said learning device stores the amount of engagement as the half-engaged point.

9. The clutch control unit according to claim 1, wherein said learning device shifts said transmission from a neutral state to a state where gears are engaged at a time of the learning of the half-engaged point, and said learning device moves said clutch piston over the whole stroke thereof by varying the duty ratio from 100% to 0% and returning to said predetermined duty ratio which is about 10% larger than that of the half-engaged point at the start of learning of the half-engaged point.

10. The clutch control unit according to claim 1, wherein a fluid coupling is arranged between said engine and said wet multiple disk clutch, and the working fluid is fed from said oil pump into an interior of said fluid coupling.

11. The clutch control unit according to claim 1, wherein at the start of learning of the half-engaged point the working fluid in said wet multiple disk clutch from the oil pump is replaced by the movement of said clutch piston, and thereafter, said learning device gradually decreases the duty ratio to increase the amount of engagement as the half-engaged point.

\* \* \* \* \*